United States Patent
Li et al.

(10) Patent No.: US 10,644,780 B2
(45) Date of Patent: *May 5, 2020

(54) METHODS AND DEVICES FOR BROADCAST TRANSMISSION AND RECEPTION

(71) Applicant: Telefonaktiebolaget LM Ericsson (publ), Stockholm (SE)

(72) Inventors: Gen Li, Beijing (CN); Jinhua Liu, Beijing (CN)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 15/565,530

(22) PCT Filed: Apr. 20, 2015

(86) PCT No.: PCT/CN2015/076935
§ 371 (c)(1),
(2) Date: Oct. 10, 2017

(87) PCT Pub. No.: WO2016/168959
PCT Pub. Date: Oct. 27, 2016

(65) Prior Publication Data
US 2018/0115361 A1    Apr. 26, 2018

(51) Int. Cl.
| H04B 7/06 | (2006.01) |
| H04L 25/02 | (2006.01) |
| H04W 16/28 | (2009.01) |
| H04W 72/04 | (2009.01) |

(52) U.S. Cl.
CPC .......... *H04B 7/0695* (2013.01); *H04B 7/063* (2013.01); *H04B 7/0617* (2013.01);
(Continued)

(58) Field of Classification Search
CPC .... H04B 7/0617; H04B 7/0639; H04B 7/063; H04B 7/0695; H04W 16/28
(Continued)

(56) References Cited

U.S. PATENT DOCUMENTS

| 2002/0137538 A1 | 9/2002 | Chen et al. |
| 2007/0206626 A1 | 9/2007 | Lee et al. |

(Continued)

FOREIGN PATENT DOCUMENTS

| CN | 1593020 A | 3/2005 |
| CN | 102405603 A | 4/2012 |

(Continued)

OTHER PUBLICATIONS

PCT International Search Report for International application No. PCT/CN2015/076935—dated Jan. 25, 2016.
(Continued)

*Primary Examiner* — Kevin M Burd
(74) *Attorney, Agent, or Firm* — Baker Botts, LLP

(57) ABSTRACT

It is disclosed a network node (600; 700), a client device (800; 900) and methods therein for transmission and reception of broadcasted messages using beam sweeping patterns, being associated with each other. A client device with information about an association between the first and second beam sweeping patterns, may determine when and where to monitor for reception of a paging message, based on receipt of a pilot message. This provides a power efficiency improvement for a UE when monitoring a broadcasted message transmitted in sweeping mode.

20 Claims, 5 Drawing Sheets

(52) U.S. Cl.
CPC ....... *H04B 7/0639* (2013.01); *H04L 25/0224* (2013.01); *H04W 16/28* (2013.01); *H04W 72/046* (2013.01); *Y02D 70/444* (2018.01)

(58) Field of Classification Search
USPC .......................................................... 375/267
See application file for complete search history.

(56) References Cited

U.S. PATENT DOCUMENTS

| | | | | |
|---|---|---|---|---|
| 2011/0065448 | A1* | 3/2011 | Song | H04B 7/0632 455/452.2 |
| 2013/0279356 | A1 | 10/2013 | Park et al. | |
| 2014/0011529 | A1 | 1/2014 | Bergel et al. | |
| 2014/0128109 | A1* | 5/2014 | Li | H04W 68/02 455/458 |
| 2015/0049824 | A1* | 2/2015 | Kim | H04B 7/0456 375/267 |

FOREIGN PATENT DOCUMENTS

| | | |
|---|---|---|
| CN | 103716081 A | 4/2014 |
| EP | 1 816 758 A2 | 8/2007 |
| JP | 2011 522462 A | 7/2011 |
| JP | 2011 526429 A | 10/2011 |
| WO | 2009 117431 A2 | 9/2009 |
| WO | 2009 117431 A3 | 9/2009 |
| WO | 2014 124237 A1 | 8/2014 |

OTHER PUBLICATIONS

Extended European Search Report for Application No./Patent No. 15889450.1—1220 / 3286848 PCT/CN2015076935—dated Mar. 16, 2018.

Notice of Reasons for Rejection issued by the Japanese Patent Office for Patent Application No. 2017-5544326—dated Jan. 8, 2019.

Communication Pursuant to Article 94(3) EPC for Application No. 15 889 450.1-1220—dated Mar. 19, 2019.

Decision to Grant issued by the Japanese Ministry of Economy, Trade and Industry for Patent Application No. 2017-554432—dated Aug. 16, 2019.

Examination Report issued by the Government of India/Intellectual Property India for Application No. 201717035809—dated Dec. 27, 2019.

* cited by examiner

METHODS AND DEVICES FOR BROADCAST TRANSMISSION AND RECEPTION

PRIORITY

This nonprovisional application is a U.S. National Stage Filing under 35 U.S.C. § 371 of International Patent Application Serial No. PCT/CN2015/076935 filed Apr. 20, 2015, and entitled "Methods And Devices For Broadcast Transmission And Reception."

TECHNICAL FIELD

This disclosure relates to broadcast transmission and reception. In more particular, it relates to a network node, a client device, and methods therein, for broadcasting messages and receiving of said messages being broadcasted, respectively.

BACKGROUND

Fifth generation (5G) mobile networks are likely to be a combination of evolved third generation (3G) technologies, fourth generation (4G) technologies and emerging, or substantially new, components such as ultra-density network (UDN), also referred to as millimetre wave (mmW) radio access type (RAT).

Due to an increasing demand to enhance capacity in wireless networks and the lack of availability of spectrum in frequency ranges (e.g. 800 MHz-3 GHz), the use of frequencies in tens of GHz range is being investigated. Investigations are ongoing to explore high frequency bands, for instance, in the range of 30 GHz, 60 GHz and 98 GHz for the purpose of mobile networks. At these frequencies, a large bandwidth of spectrum is available. This means that both operating frequency and bandwidth for 5G networks are expected to be much higher than that used in legacy mobile networks, e.g. 3G and 4G networks. However, due to relatively large signal attenuation with respect to path loss, networks operating over such high frequencies are supposed to cover small areas with densely deployed radio access nodes (AN).

FIG. 1 illustrates one example of a mmW radio access network (RAN) structure. This mmW RAN example comprises one central control unit (CCU) 102, a group of access nodes (AN) 104A-D connected to the CCU, and two registered user equipment (UEs) 106A-B.

Such dense deployment of ANs is expected to provide sufficient coverage for indoor or hot areas (spots).

The CCU is responsible to configure the connected ANs. Currently it is supposed that the total carrier bandwidth of the mmW RAT may be up to 1 or 2 GHz. This bandwidth may be composed by a number of sub-band carriers of a certain bandwidth, e.g. 100 MHz.

It is expected that high gain beamforming is mandatory for mmW RAT. For example, for a mm-wave link at 60 GHz, a loss in received power caused by oxygen absorption may be as high as 16 dB/km from an AN. Moreover, the received power of a transmitted radio of a certain frequency is inversely proportional to said frequency squared. This means that, with the same propagation distance a wavelength of 60 GHz is attenuated 29.5 dB more than a wavelength of 2 GHz, even without considering the oxygen absorption.

When considering the oxygen absorption, high gain beamforming is expected to be mandatory in order to compensate the attenuation.

High frequencies correspond to small wavelengths. Thanks to relatively small wavelengths, more antenna elements can be integrated in an antenna panel of a given size, as compared to the number of antenna elements for larger wavelengths, i.e. lower frequencies. Using more antenna elements makes it possible to reach higher beamforming gain.

However, it is bad economy having one RF chain for each antenna element if there are several tens or several hundreds of antenna elements. In these cases, multiple antenna elements typically share one RF chain and analogue phase adjustment is applied for each antenna in order to adjust a beam direction to maximize a beamforming gain.

Further, broadcasted signals are advantageously transmitted in sweeping mode, in which broadcasted signals are transmitted in a number of beams forming a sweeping pattern.

Due to the large attenuation of mmW, see above, even broadcasted signals may be transmitted using beamforming.

Broadcasted signals may be divided into two types of broadcasted signals.

The first type may comprise pilot signals for cell searching, i.e. signals for synchronization of UEs to the broadcasting AN. The first type may also comprise minimum required mandatory system information.

Pilot signals may be transmitted in sweeping mode, for which each beam covers one sector and where there is partial overlap between neighbouring beams. As a result, a desired area may be covered by a set of beams.

FIG. 2 schematically illustrates one example of a beam sweeping pattern to provide omni-directional coverage applicable for transmitting a pilot signal by an access point (AP) or radio base station such as a eNB. Numbers 0-7 denote beams which together provide the omni-directional coverage.

In practice, a UE is supposed to blindly monitor the pilot beams in order to determine the strongest beam. The maximum number of blind detections, i.e. detection of the overall number of beams, may hence be proportional to the number of pilot beams, in this example.

The second type of broadcasted signals may comprise paging messages and broadcasted system information.

Further system information and some down link (DL) control messages, such as broadcast control messages, may also be broadcasted for the reason that the target receiver of these messages include UEs in idle mode and hence may await paging messages.

High gain beamforming may be also mandatory for the second type messages in order to provide large enough coverage. Further, it is desired to provide similar coverage for these second type messages as the one of the first type messages such as pilot signals for cell searching, for which reason sweeping transmission may also be applied for these second type messages.

During the sweeping interval of the send type messages, an idle UE is intended to decode these messages until they are detected or an interval during which the messages are swept ends.

It may be concluded that in the case of mmW RAT, the broadcasted signals may be transmitted in sweeping mode in order to achieve beamforming and meanwhile provide omni-directional coverage. However, from a client device perspective, such as a UE, which needs to monitor the broadcasted signals from a transmitting AN (or network node), it means a relatively large power consumption to monitor these broadcasted signals due to the client device may need to decode the transmitted signal many times until the transmitted signal is detected, or the sweeping interval ends. The power consumption is even higher for a client device that is in idle mode. Since such client device (or UE) also monitors the system information and paging messages.

There is hence a need for a solution addressing the issues as discussed above.

SUMMARY

It is an object of exemplary embodiments to address at least some of the issues outlined above, and this object and others are achieved by a network node and a client device and methods therein, according to the appended independent claims, and by the exemplary embodiments according to the dependent claims.

According to an aspect, the exemplary embodiments provide a method performed by a network node for broadcasting messages to at least one client device being served by the network node. The method comprises broadcasting to at least one client device a first message by transmitting said first message using a first beam sweeping pattern, wherein each beam of the first beam sweeping pattern has a beam index number. The method also comprises broadcasting to the at least one client device a second message by transmitting said second message using a second beam sweeping pattern, wherein each beam of the second beam sweeping pattern has a beam index number, and wherein the second beam sweeping pattern is associated with the first beam sweeping pattern.

According to another aspect, the exemplary embodiments provide a method performed by a client device for receiving broadcasted messages from a network node that serves the client device. The method comprises receiving, in a beam having a first beam index number, a first message that is broadcasted by the network node using a first beam sweeping pattern. The method also comprises obtaining information about an association between the first beam sweeping pattern and a second beam sweeping pattern. The method also comprises determining a second beam index number specifying a beam where to expect receiving a second message being broadcasted by the network node using the second beam sweeping pattern, based on the first beam index number and the obtained information about the association. In addition, the method comprises receiving the second message in the beam having the determined second beam index number.

According to yet another aspect, the exemplary embodiments provide a network node that is configured to broadcast messages to at least one client device being associated with the network node. The network node comprises a processor module or processor and a memory module or memory. The memory module comprises instructions executable by the processor module whereby the network node is operative to broadcast to at least one client device a first message by transmitting said first message using a first beam sweeping pattern, where each beam of the first beam sweeping pattern has a beam index number. The memory module also comprises instructions executable by the processor module whereby the network node is operative to broadcast to the at least one client device a second message by transmitting said second message using a second beam sweeping pattern, where each beam of the first beam sweeping pattern has a beam index number, and, where the second beam sweeping pattern is associated with the first beam sweeping pattern.

According to yet another aspect, the exemplary embodiments provide a client device that is configured to receive a broadcasted message from a network node with which the client device is associated. The client device comprises a processor module or processor and a memory module or memory. The memory module comprises instructions executable by said processor module whereby said network node is operative to receive in a beam having a first beam index number, a first message that is broadcasted by the network node using a first beam sweeping pattern. The client device is also operable to obtain information about an association between the first beam sweeping pattern and a second beam sweeping pattern with which a second message is to be broadcasted by the network node. The client device is also operable to determine a second beam index number of when to expect a second message to be broadcasted by the network node using the second beam sweeping pattern, based on the first beam index number and the obtained information about the association. In addition, the client device is operable to receive the second message as transmitted in the determined second beam index number.

The present disclosure provides the advantage that the power efficiency of a client device is improved when monitoring broadcast messages, as compared to previous monitoring methods.

BRIEF DESCRIPTION OF THE DRAWINGS

Embodiments will now be described in more detail, and with reference to the accompanying drawings, in which.

DETAILED DESCRIPTION

In the following description, different embodiments of the exemplary embodiments will be described in more detail, with reference to accompanying drawings. For the purpose of explanation and not limitation, specific details are set forth, such as particular examples and techniques in order to provide a thorough understanding.

This disclosure concerns transmission of broadcast messages, comprising system information and a paging message, using a configured, or predefined, sweeping pattern with a certain relative timing and/or frequency association with respect to transmission of a pilot message using a beam sweeping pattern. Since the sweeping pattern of the paging message may be either predefined of configured, a UE or an access node, hereinafter referred to as a UE, may derive the timing and/or frequency window where the beam carrying the broadcast messages target the UE.

Therefore the UE may know in which timing and/or frequency window the broadcast message targeting the UE is transmitted. Since the UE only has to monitor the timing and/or frequency window in which the broadcast message is transmitted, targeting the UE out of the number of transmitted windows corresponding to the beams used to transmit the broadcast message in sweeping mode, the UE may detect the broadcast message with significantly less tentative detections. As a result, the UE power consumption may be considerably reduced, especially for idle UEs, when the UE may need to frequently monitor system information and paging messages.

When or where the UE detects the strongest pilot beam, the UE may determine the timing and/or frequency window to monitor the beam of a broadcast message which is sent separately from the pilot signals, according to an association between the pilot sweeping pattern and the broadcast message sweeping pattern. Again, as a consequence, the UE does not have to monitor all beams transmitting the broadcast message during the sweeping interval.

The embodiments of this disclosure are applicable in an environment of mmW RAT.

Figure 1:
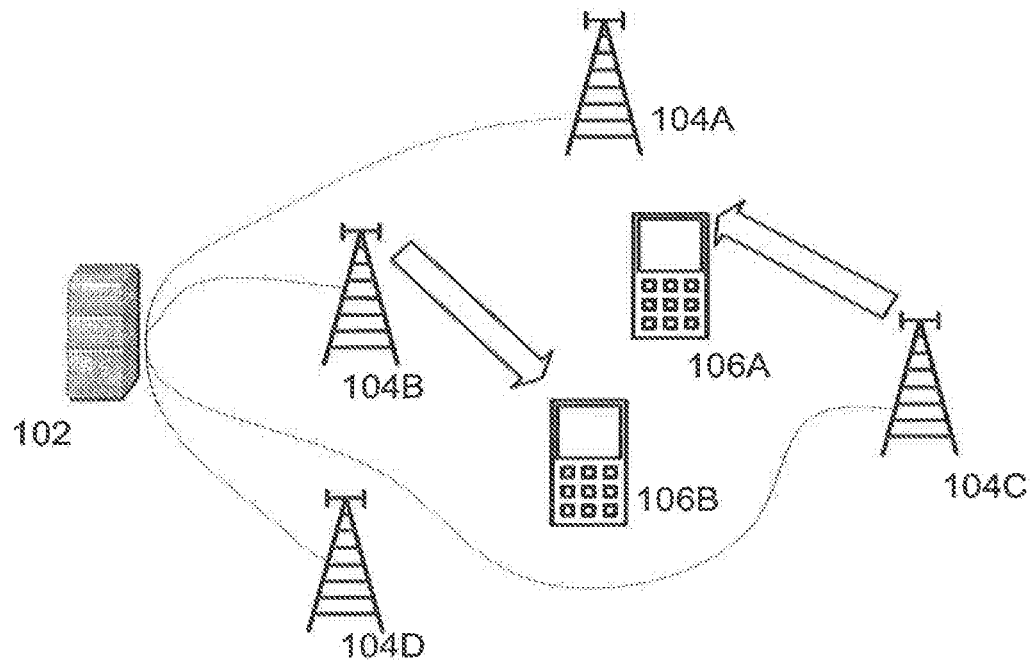
FIG. 1 schematically illustrates one example of a mmW RAN structure.
Figure 2:
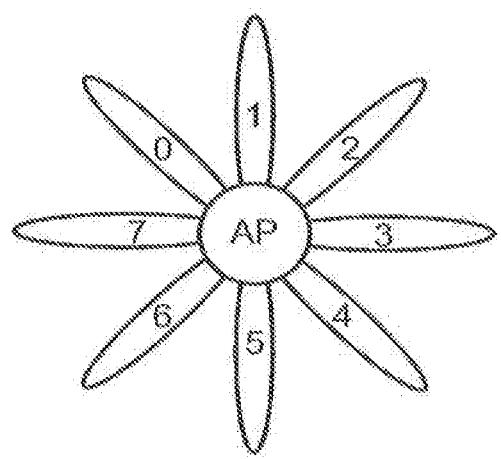
FIG. 2 schematically illustrates one example of a beam sweeping pattern.
Figure 3:
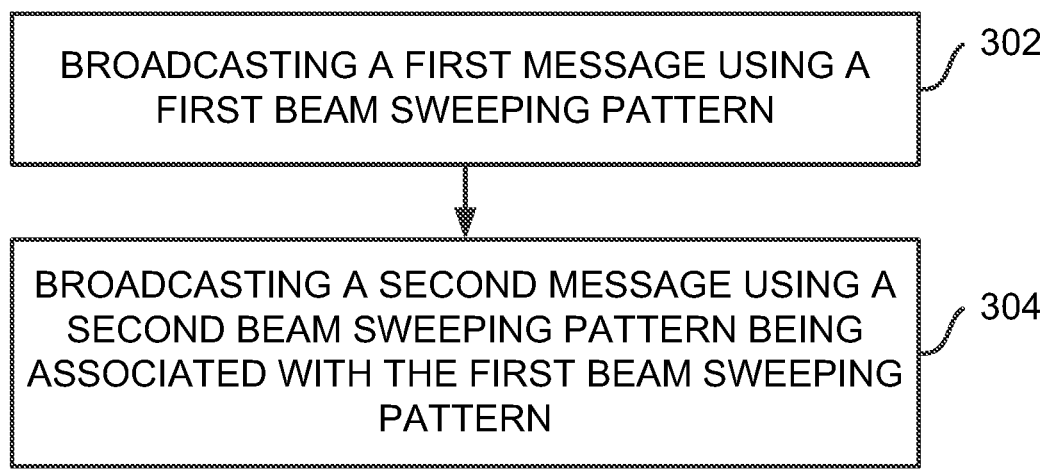
FIG. 3 illustrates a flowchart of a method performed in a network node, according to exemplary embodiments.

FIG. 3 illustrates a flowchart of a method performed by a network node for broadcasting messages to at least one client device being served by the network node, according to exemplary embodiments. The method comprises broadcasting 302 to at least one client device a first message by transmitting said first message using a first beam sweeping pattern, wherein each beam of the first beam sweeping pattern has a beam index number. The method also comprises broadcasting 304 to the at least one client device a second message by transmitting said second message using a second beam sweeping pattern, wherein each beam of the second beam sweeping pattern has a beam index number, and wherein the second beam sweeping pattern is associated with the first beam sweeping pattern.

Broadcasting 302 the first message may comprise broadcasting a pilot message for enabling synchronization of the at least one client device relative to the network node.

Broadcasting 304 the second message may comprise broadcasting a network system message.

Broadcasting 304 the second message may comprise broadcasting a paging message to localize the at least one client device.

Figure 4:
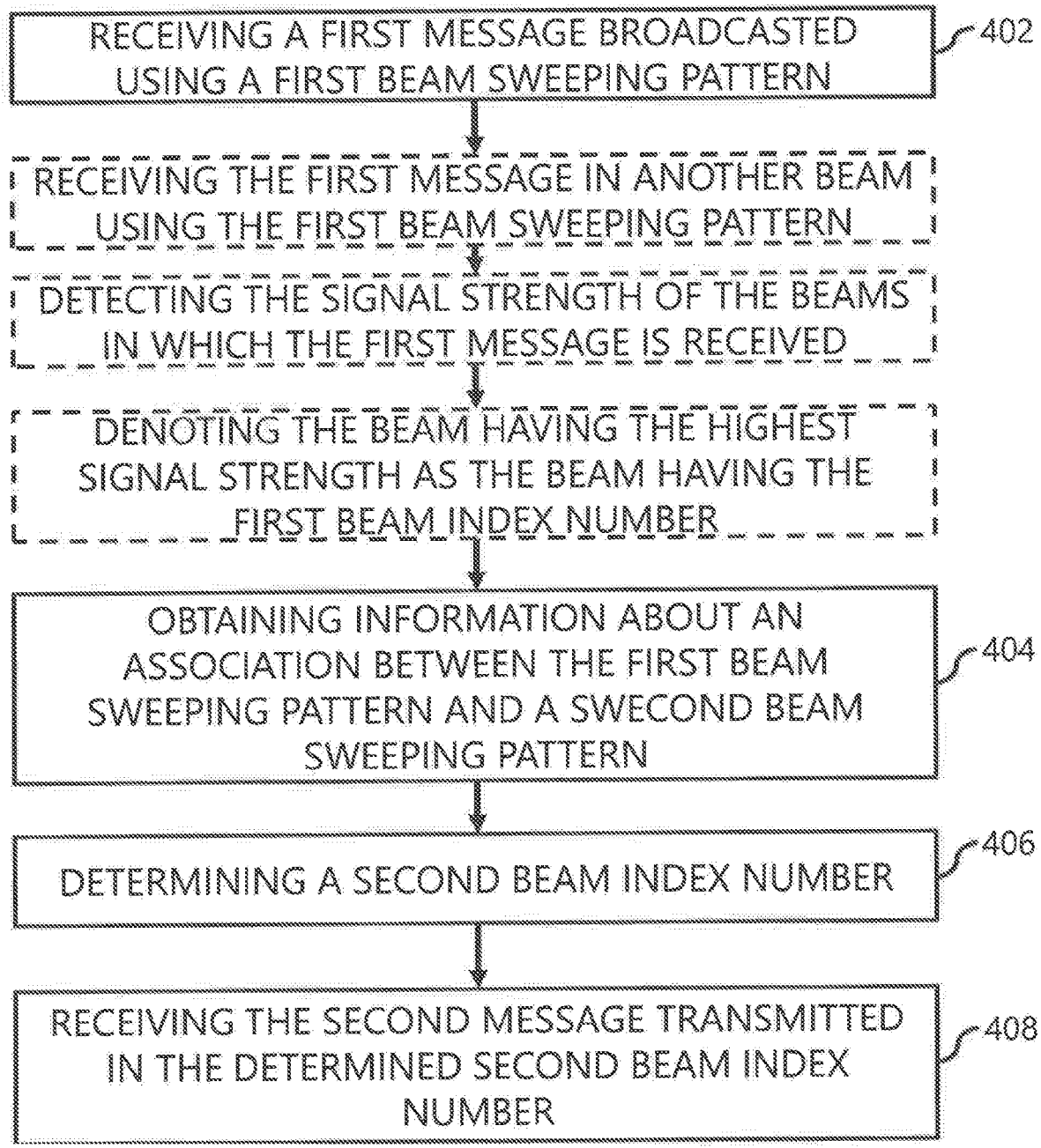
FIG. 4 illustrates a flowchart of a method performed in a client device, according to exemplary embodiments.

FIG. 4 illustrates a flowchart of a method performed by a client device for receiving broadcasted messages from a network node that serves the client device. The method comprises receiving 402, in a beam having a first beam index number, a first message that is broadcasted by the network node using a first beam sweeping pattern. The method also comprises obtaining 404 information about an association between the first beam sweeping pattern and a second beam sweeping pattern. The method also comprises determining 406 a second beam index number specifying a beam where to expect receiving a second message being broadcasted by the network node using the second beam sweeping pattern, based on the first beam index number and the obtained information about the association. In addition, the method comprises receiving 408 the second message in the beam having the determined second beam index number.

The method may further comprise receiving in another beam having another beam index number, the first message broadcasted by the network node using the first beam sweeping pattern; detecting the signal strength of said received another beam and the signal strength of the received beam having the first beam index number; and denoting the beam, in which the signal strength is the highest among the beam having the first beam index number and the beam having said another beam index number, as the beam having the first beam index number.

Obtaining 404 information about the association may further comprise obtaining an offset between the first beam sweeping pattern and the second beam sweeping pattern.

The method may further comprise obtaining the offset by one of: obtaining a configuration from the network node to which the client device is attached, obtaining the offset by being pre-defined, and obtaining the offset by being derived according to pre-defined rules.

The offset may be specific to the client device. The offset may alternatively be specific to the network node to which the client device is attached.

The offset may be specific to the second message being broadcasted. When broadcasting a second message being a paging message, one offset may be used, and when broadcasting a second message comprising system information, another offset may be used.

Obtaining 404 information about the association may comprise obtaining the number of beams in which the first message is transmitted using the first beam sweeping pattern, and wherein determining the second beam index number further is based on the obtained number of beams.

Obtaining 404 information about the association may comprise obtaining a one-to-one correspondence between the second beam index number and the first beam index number.

Determining 406 the second beam index number may comprise using an obtained one-to-one correspondence between the second beam index number and the first beam index, by having the first beam index number as input data into the one-to-one correspondence, and extracting from the one-to-one correspondence the second beam index number that corresponds to the first beam index number.

Determining 406 the second beam index number may comprise looking up the second beam index number in a table, where this table comprises the association between first beam index number and second beam index number, where the looking up comprises using the first beam index number as input data into the table, and extracting from the table the second beam index number that corresponds to the first beam index number.

The table is one example of a one-to-one (1-to-1) correspondence between a first beam index number and a second beam index number, where the first beam index number is the number of the strongest beam in the first beam sweeping pattern, and the second beam index number is where the second message, such as a paging message, is expected to target the UE.

When the association comprises an offset, the determining 406 the second beam index number may comprise calculating the sum of the first beam index number and the offset. For instance, when the first beam index number plus the offset is less than the number of beams used in the first beam sweeping pattern, there is no need to use a modulus calculation of the sum. For this reason the number of beams used in the first beam sweeping pattern is not always necessary.

In other embodiments, determining 406 the second beam index number may further be based on the number of beams used in the transmission of the first message. Especially, determining 406 the second beam index number may comprise calculating the second beam index number by calculating a sum of the first beam index number and the offset, and calculating the number of beams used in the transmission of the first message modulus of the obtained sum. The modulus calculation may be used when the sum of the first beam index number and the offset, is equal to, or is larger than, the number of beams used in the transmission of the first message.

Within the method performed by a client device, the beam having the first beam index number may comprise a composite beam that comprises a group of beams of the first beam sweeping pattern.

Within the method performed by a client device, the beam having the second beam index number may alternatively comprise a composite beam that comprises a group of beams of the second beam sweeping pattern.

Figure 5A:
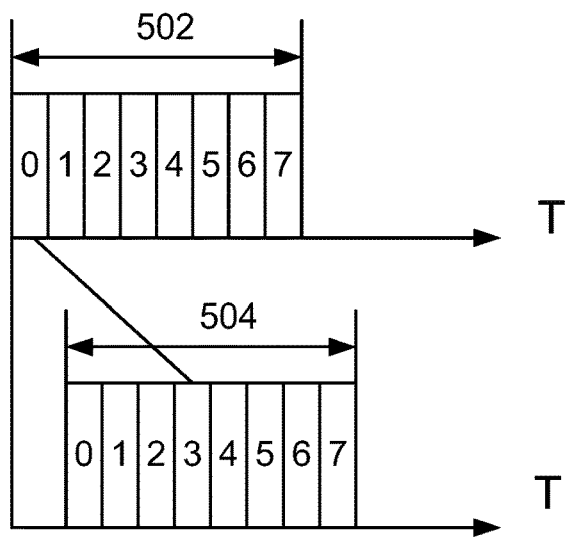
FIGS. 5A-C schematically illustrate examples of second message transmission relating to first message, according to exemplary embodiments.
Figure 5B:
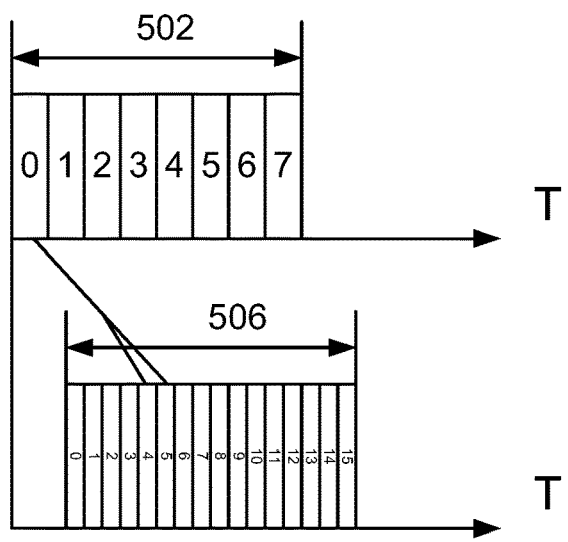
Figure 5C:
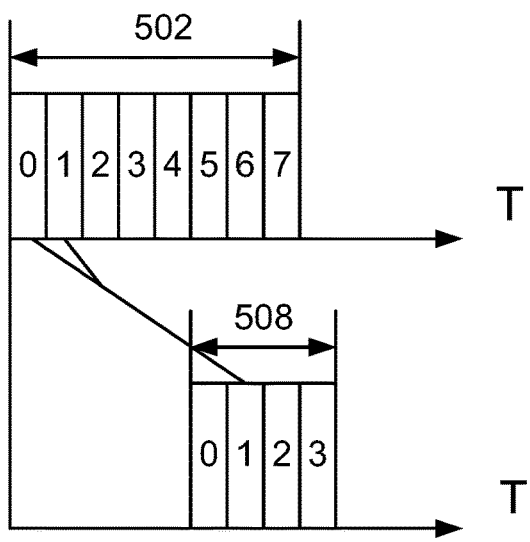

FIGS. 5A-C schematically illustrate some examples of second message transmission relating to first message transmission in which the second beam sweeping pattern is associated with the first beam sweeping pattern in time, according to exemplary embodiments. Within other embodiments, associations may be in time and frequency. Within still other embodiments associations may be in frequency only.

Within these examples the first message comprises a pilot message, whereas the second message comprises a paging message, although the first and second messages may comprise other information too.

The beam sweeping pattern of a second message is associated with the beam sweeping pattern of a first message. The UE, being one example of a client device, may blindly monitor beams transmitted by the network node. The UE may detect several beams carrying a pilot message. The UE may then determine the strongest beam in which the pilot message is transmitted.

FIG. 5A presents one example of how a paging message may be transmitted using beams in relation to the transmission of the pilot message. The numbers of beams used for transmitting the pilot message is denoted by 502. Each beam may carry a beam index number, which is detectable by the UE. In this example, the beams carry beam index number 0-7.

In this example, it is supposed that the UE detects that the beam having beam index number 0 is the strongest. The UE may instead detect that any one of the beams corresponding to beam index numbers 0-7 may be the strongest.

The UE may obtain information about how the paging message is transmitted using a beam sweeping mode in relation to the way in which the pilot message is transmitted. This information is herein denoted as the association between the second beam sweeping pattern and the first beam sweeping pattern.

The UE may obtain information about the association either by being configured or predefined. Information about the association may be obtained from a central control unit via signalling from the network node.

In this example of FIG. 5A, the association comprises or indicates that the beam index number in which the paging signal will be transmitted is the beam index number of strongest beam for the pilot message, plus an offset, which in this example equals to 3. As illustrated in FIG. 5A, the strongest pilot beam has beam index number 0, whereas the beam index number of the beam in which the paging message is transmitted may be calculated by summing the two figures, resulting in 0+3 which equals to 3.

Thus the beam having beam index number 3 of the beams 504 being transmitted using the second beam sweeping pattern will target the UE with the paging message.

As a consequence, the UE limits its monitoring window to the beam having beam index number 3, or simply beam number 3.

The UE is may be configured with information about when the network node starts transmitting the paging message. In this case it is enough for the UE to know which beam of the number of beams to monitor in order to detect the paging message.

It is noted that if the beam index number of the strongest beam for the pilot signal in this example is 5, 6, 7, then the beam index number of the paging message equals to the first beam index number, plus 3, will not be "8", "9" or "10", but rather the sweeping pattern restarts will beam index number 0 after having transmitted beam index number 7.

Denoting the number of beams used for the pilot message by Npilot, the beam index number of the strongest pilot beam denoted by npilot and the relative offset between the second and the first sweeping patterns denoted by $\Delta$, the beam index number in which the paging message is transmitted denoted nbroadcast may be determined using Equation 1:

$$n\text{broadcast} = (n\text{pilot} + \Delta) \text{ modulus } N\text{pilot} \quad (\text{Eq. 1})$$

If e.g. $(n\text{pilot}+\Delta) = N\text{pilot}+1$, then $(n\text{pilot}+\Delta)$ modulus Npilot equals to 1.

Thus, if the pilot message i.e. the second message is strongest in the beam having index number beam npilot, then the best beam to monitor for the paging message is the beam having beam index number nbroadcast.

FIG. 5B schematically illustrates another example of how to broadcast a second message in sweeping mode in relation to broadcasting using a first beam sweeping pattern.

In contrast to FIG. 5A in which the number of beams used in the first beam sweeping pattern equals to the number of beams used in the second beam sweeping pattern, in FIG. 5B the number of beams used in said beam sweeping patterns is different.

In FIG. 5B, it is seen that 502 denotes beams having beam index number 0-7, whereas 506 denotes beams having beam index numbers 0-15. The number of beams used in transmitting the paging message is larger than the number of beams used in transmitting the pilot message.

As a beam sweeping pattern comprises beams which together provide omni-directional coverage, the number of beams used in each beam sweeping pattern may cover one full turn. The number of beams used in the first beam sweeping pattern therefore may in this respect correspond to the number of beams used in the second beam sweeping pattern. Phrased differently, the number of beams used in the first beam sweeping pattern may be mapped on the number of beams used in the second beam sweeping pattern. This implies that a beam index number in the first beam sweeping pattern may be mapped on a group of beams in the second beam sweeping pattern, or the other way around. Since the number of beams used in the first beam sweeping pattern is eight, i.e. 0-7, and the number of beams used in the second beam sweeping pattern is 16, i.e. 0-15, each group of beams for the second beam sweeping pattern corresponds to two beam index numbers, corresponding to two beams.

Similar to above, let us assume that the UE or client device has detected that beam having beam index number 0 is the strongest, when detecting the pilot signal. In this example of FIG. 5B it is assumed the UE has obtained information about the association between the first and the second beam sweeping patterns, where the association comprises an offset that equals to 2.

The beam index number or here rather the beam group index number may be determined using an equation very similar to Equation 1.

Denoting the number of beams used for the pilot message by Npilot, the beam index number of the strongest pilot beam by npilot and the relative offset between the second and the first sweeping patterns by Δ, the beam group index number in which the paging message is transmitted, ng,broadcast may be determined using Equation 2:

$$ng,broadcast=(npilot+\Delta) \text{ modulus } Npilot \qquad (Eq. 2)$$

Using the numbers of the example of FIG. 5B, the beam group index number in which the paging message is transmitted, ng,broadcast is calculated as (0+2) modulus 8 which equals to 2.

The second beam index numbers which correspond to the beam group index number of 2, are beam index numbers 4 and 5. Hence the beam group index number is 2. This is since group index number 0 corresponds to second beam index numbers 0 and 1, and group index number 1 corresponds to second beam index numbers 2 and 3.

Thus, having detected that the beam having beam index number 0 has the strongest pilot signal, the paging messages is expected to target the UE is beams 4 and 5 within the second beam sweeping pattern.

FIG. 5C schematically illustrates another example of how to broadcast a second message in sweeping mode in relation to broadcasting using a first beam sweeping pattern.

Similar to FIG. 5B, FIG. 5C illustrates a second beam sweeping pattern having a number of beams 508 which differs from the number of beams 502 used in the first beam sweeping pattern.

In FIG. 5C, it is seen that 502 denotes beams having beam index number 0-7, whereas 508 denotes beams having beam index numbers 0-3. The number of beams which are used in transmitting the paging message is thus smaller than the number of beams used in transmitting the pilot message.

For the same reason that the sweeping pattern typically provides omni-directional coverage the first number of beams 502 may be mapped onto the second number of beams 508.

Similar to the example of FIG. 5B, groups of beam index numbers are herein created. However, since the number of beams 508 used for the paging message is less than the number of beams 502 used for the pilot message, the number of beams for the pilot message is divided into a number of groups that equals to the number of beams used for the paging message. Since there are 4 beams used for the paging message in FIG. 5C, each group of beams for the pilot message, comprises 2 beams (8/4=2).

Similar to above, denoting the number of beams used for the pilot message by Npilot, the beam group index number having the strongest pilot beam by ng,pilot and the relative offset between the second and the first sweeping patterns by Δ the beam index number in which the paging message is transmitted, nbroadcast may be determined using Equation 3:

$$nbroadcast=(ng,pilot+\Delta) \text{ modulus } Npilot \qquad (Eq. 3)$$

The beam group index number ng,pilot thus denotes the beam group index in which the strongest pilot beam is detected.

In this example of FIG. 5C it is seen that the beam group index number is 0, and the offset between the second and the first beam sweeping patterns is 1. Thus, the beam index number in which the paging message is targeted the UE may be calculated by (0+1) modulus 8 which equals 1.

With an offset of 1, having detected that the strongest pilot message is detected within beam group index 0, the paging message targeting the UE is expected in the beam having beam index number 1.

A group of beams within a common group index number may be denoted a composite beam comprising two or more beams.

When the UE receives, in a beam having a first beam index number, a first message that is broadcasted by the network node using a first beam sweeping pattern, the UE may also receive the first message in a beam being a neighbour to the one having the first beam index number. Also these beam index numbers may denote beam group index numbers, where each group comprises two or more singular beams index numbers, or beams.

By detecting a pilot message in neighbouring beams, misdetection of the reception of a broadcasted second message transmitted using the second beam sweeping pattern, due to UE mobility after monitoring of the first message being swept, is reduced, since two or more beams are being monitored for the reception of the second message.

Where the association between the first and second beam sweeping patterns comprises an offset, this offset may be specific to the network node from which the messages were transmitted, or alternatively specific to the UE or client device to which the network node is attached.

The offset may according to alternative embodiments be specific to the second message being broadcasted. When broadcasting a second message being a paging message, one offset may be used, and when broadcasting a second message comprising system information, a different offset may be used.

An offset may be considered to be a displacement measure or relative measure between the first and second beam sweeping patterns.

The offset may as mentioned above, be obtained from a central control unit (CCU) via the network node. The association may alternatively be predefined or derived by the UE according to predefined rules.

One example of a predefined rule is that the offset may be derived based on an identity (ID) of a network node, an AN, provided that the offset is specific to the network node, the AN. For example, an offset may equal to the respective ID modulus Npilot, where Npilot denotes the number of beams used in the first beam sweeping pattern.

In yet another embodiment, the relative offset applicable to a broadcast system information may be uniform in an entire network, whereas the offset applicable to the paging message may be network, AN or UE specific. Alternatively, the offsets for the broadcast system information message and the paging message, sent using the second beam sweeping pattern, may be predefined to be different values.

Thus, by means of an association, the UE may only need to determine the strongest pilot beam(s) by blind detection, after which it may be determined when or where to monitor for detection of a broadcasted signal or message, such as a paging signal or message. By determining in which timing or frequency window the broadcast signal or message is expected to be targeted the UE, the UE does not need to maintain monitoring state during an entire beam sweeping interval of the broadcast message, corresponding to omni-directional coverage of the sweeping beam. Ideally, the power consumption for a broadcast/paging message monitoring may be reduced by a factor being equal to the number of beams used in the first beam sweeping pattern. For example, in FIG. 5A, the power consumption for monitoring of the second message being broadcasted in sweeping mode may be reduced by a factor of 8.

As described, FIGS. 5A-C schematically illustrate an association in time between the first and second beam sweeping patterns. However, the association may equally well be in the frequency domain. A frequency applied in a beam having a first beam index number may have a relation to the frequency applied in a beam used in the second sweeping pattern, and having a second beam index number.

According to some embodiments an association may be both in the time and frequency domain. Using such an association, the time and frequency, used when transmitting a first beam such as a pilot beam, may be related to the time and frequency of where to expect a paging message targeting the UE.

Figure 6:
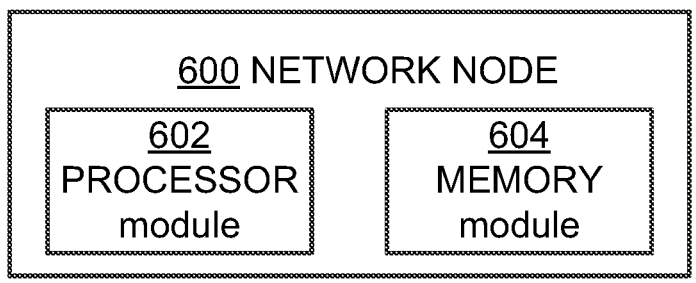
FIGS. 6 and 7 present network nodes according to exemplary embodiments.

FIG. 6 schematically presents a network node 600 configured to broadcast messages to at least one client device being associated with the network node. The network node 600 comprises a processor 602 or processor module and a memory 604 or memory module. The memory 604 or memory module comprises instructions executable by the processor 602 or processor module whereby the network node 600 is operative to broadcast to at least one client device a first message by transmitting said first message using a first beam sweeping pattern, where each beam of the first beam sweeping pattern has a beam index number. The memory 604 or memory module also comprises instructions executable by the processor 602 or processor module whereby the network node 600 is operative to broadcast to the at least one client device a second message by transmitting said second message using a second beam sweeping pattern, where each beam of the first beam sweeping pattern has a beam index number, and, where the second beam sweeping pattern is associated with the first beam sweeping pattern.

The network node 600 may also be operable to broadcast a pilot message for enabling synchronization of the at least one client node relative to the network node.

The network node 600 may also be operable to broadcast a network system message.

The network node 600 may also be operable to broadcast a paging message to localize the client node.

The network node 600 may comprise a radio base station or an eNodeB.

The present disclosure also comprises a computer program, comprising instructions, when executed on at least one processor or processor module, cause the at least one processor or processor module of the network node to carry out the method previously described.

Figure 7:
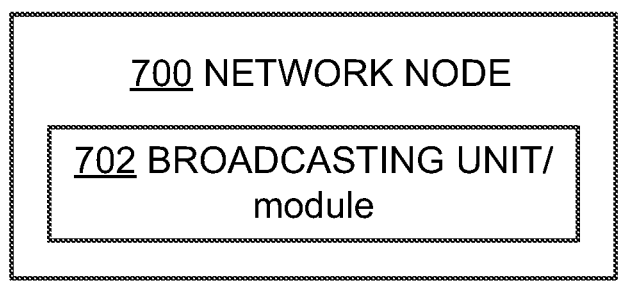

FIG. 7 schematically presents a network node 700 configured to broadcast messages to at least one client device being associated with the network node. The network node 700 comprises a broadcasting unit/module 702 is configured to broadcast to at least one client device a first message by transmitting said first message using a first beam sweeping pattern, where each beam of the first beam sweeping pattern has a beam index number. The broadcasting unit/module 702 is also configured to broadcast to the at least one client device a second message by transmitting said second message using a second beam sweeping pattern, where each beam of the first beam sweeping pattern has a beam index number, and, where the second beam sweeping pattern is associated with the first beam sweeping pattern.

Figure 8:
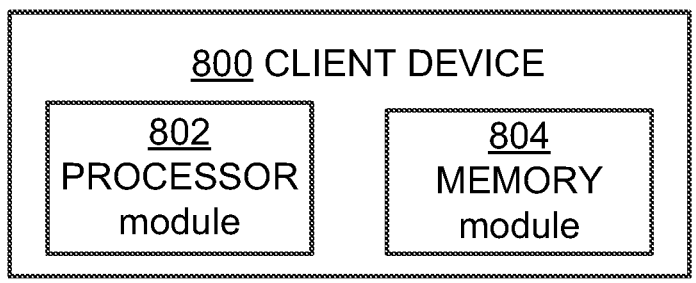
FIGS. 8 and 9 present client devices according to exemplary embodiments.

FIG. 8 schematically presents a client device 800 configured to receive a broadcasted message from a network node with which the client device is associated. The client device comprises a processor 802 or processor module and a memory 804 or memory module. The memory 804 or memory module comprises instructions executable by said processor 802 or processor module whereby said network node is operative to receive in a beam having a first beam index number, a first message that is broadcasted by the network node using a first beam sweeping pattern. The client device is also operable to obtain information about an association between the first beam sweeping pattern and a second beam sweeping pattern with which a second message is to be broadcasted by the network node. The client device is also operable to determine a second beam index number of when to expect a second message to be broadcasted by the network node using the second beam sweeping pattern, based on the first beam index number and the obtained information about the association. In addition, the client device is operable to receive the second message as transmitted in the determined second beam index number.

The client device 800 may also be operable to receive in another beam having another beam index number, the first message broadcasted by the network node using the first beam sweeping pattern; detect the signal strength of said received another beam and the signal strength of the received beam having the first beam index number; and denote the beam, in which the signal strength is the highest among the beam having the first beam index number and the beam having said another beam index number, as the beam having the first beam index number.

The client device 800 may also be operable to obtain an offset between the first beam sweeping pattern and the second beam sweeping pattern.

The client device 800 may also be operable to obtain the offset by one of: obtain a configuration from the network node to which the client device is attached, obtain the offset by being pre-defined and obtain by being derived according to pre-defined rules.

The client device 800 may also be operable to obtain the number of beams in which the first message is transmitted using the first beam sweeping pattern, and to determine the second beam index number based on the number of beams.

The client device 800 may also be operable, where the obtained information about the association comprises an offset, to determine the second beam index number by calculating the sum of the first beam index number and the offset.

The client device 800 may also be operable to determine the second beam index number further based on the number of beams used in the transmission of the first message.

The client device 800 may also be operable to determine the second beam index number by calculating a sum of the first beam index number and the offset, and to calculate the number-of-beams-used-in-the-transmission-of-the-first-message modulus of the obtained sum.

The client device 800 may also be operable to obtain a one-to-one correspondence between the second beam index number and the first beam index number.

The client device 800 may also be operable to determine the second beam index number using the one-to-one correspondence between the second beam index number and the first beam index, by having the first beam index number as input data into the one-to-one correspondence, and to extract from the one-to-one correspondence the second beam index number that corresponds to the first beam index number.

A beam received by the client device 800, the beam having the first beam index number may comprise a composite beam that comprises a group of beams of the first beam sweeping pattern.

A beam received by the client device 800, the beam having the second beam index number may comprise a composite beam that comprises a group of beams of the second beam sweeping pattern.

The present disclosure also comprises a computer program, comprising instructions, when executed on at least one processor or processor module cause the at least one processor or processor module of the client device to carry out the method described earlier.

Figure 9:
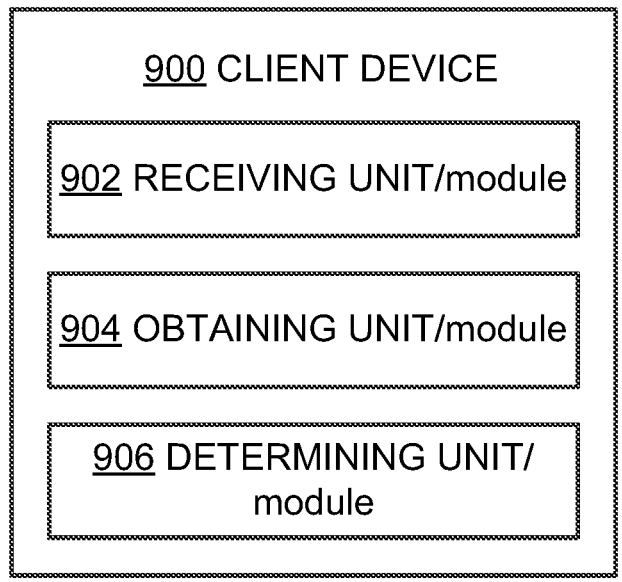

FIG. 9 presents a client device 900 configured to receive a broadcasted message from a network node with which the client device is associated. The client device comprises a receiving unit/module 902, an obtaining unit/module 904 and a determining unit/module 906. The receiving unit/module 902 is adapted to receive in a beam having a first beam index number, a first message that is broadcasted by the network node using a first beam sweeping pattern. The obtaining unit/module 904 is adapted to obtain information about an association between the first beam sweeping pattern and a second beam sweeping pattern with which a second message is to be broadcasted by the network node. The determining unit/module 906 is adapted to determine a second beam index number of when to expect a second message to be broadcasted by the network node using the second beam sweeping pattern, based on the first beam index number and the obtained information about the association. In addition, the receiving unit/module is adapted to receive the second message as transmitted in the determined second beam index number. The client device may be a UE.

Embodiments of the present exemplary embodiments have the advantage that the power efficiency of the client device is improved for monitoring of broadcast messages, as compared to previous monitoring methods.

ABBREVIATIONS

AN access node
AP access point
dB decibel
DL downlink
GHz Giga Hertz
RAN radio access network
RAT radio access type
UDN ultra-density network
UE use equipment

The invention claimed is:

1. A method performed by a client device for receiving broadcasted messages from a network node that serves the client device in a millimetre wave (mmW) radio access type network, the method comprising:
receiving, in a beam having a first beam index number, a first message that is broadcasted by the network node using a first beam sweeping pattern;
obtaining information about an association between the first beam sweeping pattern and a second beam sweeping pattern, wherein obtaining information about the association comprises obtaining an offset in time between the first beam sweeping pattern and the second beam sweeping pattern;
determining a second beam index number specifying a beam where to expect receiving a second message being broadcasted by the network node using the second beam sweeping pattern, based on the first beam index number and the obtained information about the association; and
receiving the second message in a beam having the determined second beam index number.

2. The method according to claim 1, further comprising:
receiving in another beam having another beam index number, the first message broadcasted by the network node using the first beam sweeping pattern;
detecting the signal strength of said received another beam and the signal strength of the received beam having the first beam index number; and
denoting the beam, in which the signal strength is the highest among the beam having the first beam index number and the beam having said another beam index number, as the beam having the first beam index number.

3. The method according to claim 1, wherein obtaining information about the association comprises obtaining an offset between the first beam sweeping pattern and the second beam sweeping pattern.

4. The method according to claim 3, further comprising obtaining the offset by one of: obtaining a configuration from the network node to which the client device is attached, obtaining the offset by being pre-defined, and obtaining the offset by being derived according to pre-defined rules.

5. The method according to claim 1, wherein obtaining information about the association comprises obtaining the number of beams in which the first message is transmitted using the first beam sweeping pattern, and wherein determining the second beam index number further is based on the obtained number of beams.

6. The method according to claim 1, where the obtained information about the association comprises an offset and wherein determining the second beam index number comprises calculating the sum of the first beam index number and the offset.

7. The method according to claim 6, wherein determining the second beam index number further is based on the number of beams used in the transmission of the first message.

8. The method according to claim 7, wherein determining the second beam index number comprises calculating the second beam index number by calculating a sum of the first beam index number and the offset, and calculating the number-of-beams-used-in-the-transmission-of-the-first-message modulus of the obtained sum.

9. The method according to claim 1, wherein obtaining information about the association comprises obtaining a one-to-one correspondence between the second beam index number and the first beam index number.

10. The method according to claim 9, wherein determining the second beam index number comprises using the one-to-one correspondence between the second beam index number and the first beam index, by using the first beam index number as input data into the one-to-one correspondence, and extracting from the one-to-one correspondence the second beam index number that corresponds to the first beam index number.

11. The method according to claim 1, wherein the beam having the first beam index number comprises a composite beam that comprises a group of beams of the first beam sweeping pattern, or wherein the beam having the second beam index number comprises a composite beam that comprises a group of beams of the second beam sweeping pattern.

12. A client device configured to receive a broadcasted message in a millimetre wave (mmW) radio access type network from a network node with which the client device is associated, the client device comprising:
a processor; and
a memory, said memory containing instructions executable by said processor whereby said network node is operative to:

receive in a beam having a first beam index number, a first message that is broadcasted by the network node using a first beam sweeping pattern;

obtain information about an association between the first beam sweeping pattern and a second beam sweeping pattern with which a second message is to be broadcasted by the network node, wherein obtaining information about the association comprises obtaining an offset in time between the first beam sweeping pattern and the second beam sweeping pattern;

determine a second beam index number of when to expect a second message to be broadcasted by the network node using the second beam sweeping pattern, based on the first beam index number and the obtained information about the association; and receive the second message as transmitted in the determined second beam index number.

13. The client device according to claim 12, further being operable to receive in another beam having another beam index number, the first message broadcasted by the network node using the first beam sweeping pattern; detect the signal strength of said received another beam and the signal strength of the received beam having the first beam index number; and denote the beam, in which the signal strength is the highest among the beam having the first beam index number and the beam having said another beam index number, as the beam having the first beam index number.

14. The client device according to claim 12, further being operable to obtain an offset between the first beam sweeping pattern and the second beam sweeping pattern.

15. The client device according to claim 14, further being operable to obtain the offset by one of: obtain a configuration from the network node to which the client device is attached, obtain the offset by being pre-defined and obtain by being derived according to pre-defined rules.

16. The client device according to claim 12, further being operable to obtain the number of beams in which the first message is transmitted using the first beam sweeping pattern, and to determine the second beam index number based on the number of beams.

17. The client device according to claim 12, where the obtained information about the association comprises an offset and wherein client device further is operable to determine the second beam index number by calculating the sum of the first beam index number and the offset.

18. The client device according to claim 17, further being operable to determine the second beam index number further based on the number of beams used in the transmission of the first message.

19. The client device according to claim 12, further being operable to obtain a one-to-one correspondence between the second beam index number and the first beam index number.

20. The client device according to claim 19, further being operable to determine the second beam index number using the one-to-one correspondence between the second beam index number and the first beam index, by having the first beam index number as input data into the one-to-one correspondence, and to extract from the one-to-one correspondence the second beam index number that corresponds to the first beam index number.

* * * * *